United States Patent
Rose et al.

(10) Patent No.: US 9,506,819 B2
(45) Date of Patent: Nov. 29, 2016

(54) FAST RESPONSE TEMPERATURE MEASUREMENT WITHIN A GAS TURBINE

(75) Inventors: Martin Rose, Waldenbuch (DE); Björn Weigel, Stuttgart (DE); Christian Eichler, München (DE); Stephan Staudacher, Tiefenbronn (DE)

(73) Assignee: BERNS ENGINEERING CONSULTING GMBH (CH)

( * ) Notice: Subject to any disclaimer, the term of this patent is extended or adjusted under 35 U.S.C. 154(b) by 961 days.

(21) Appl. No.: 13/377,461

(22) PCT Filed: Jun. 10, 2009

(86) PCT No.: PCT/EP2009/004198
§ 371 (c)(1),
(2), (4) Date: Jan. 23, 2012

(87) PCT Pub. No.: WO2010/142307
PCT Pub. Date: Dec. 16, 2010

(65) Prior Publication Data
US 2012/0114011 A1    May 10, 2012

(51) Int. Cl.
*G01K 3/00* (2006.01)
*G01K 7/16* (2006.01)
(Continued)

(52) U.S. Cl.
CPC ............... *G01K 7/16* (2013.01); *F01D 17/085* (2013.01); *F01D 21/003* (2013.01); *G01K 13/02* (2013.01)

(58) Field of Classification Search
CPC ...... G01K 7/16; G01K 13/02; F01D 17/085; F01D 21/003
USPC ............. 338/22 R, 28, 25; 374/163, 185, 29, 374/137, 147, 148
See application file for complete search history.

(56) References Cited

U.S. PATENT DOCUMENTS

| 4,377,652 A | * | 3/1983 | Ohmura et al. | 524/104 |
| 4,722,609 A | * | 2/1988 | Epstein et al. | 374/30 |

(Continued)

FOREIGN PATENT DOCUMENTS

DE    EP0726450    * 8/1996

OTHER PUBLICATIONS

Iliopoulou V et al: "The dual thin-film probe for high-frequency flow temperature measurements" Proceedings of the Institution of Mechanical Engineers. Part A: Journal of Power and Energy, Sep. 1, 2005, vol. 9, No. 6 pp. 461-469.*

(Continued)

*Primary Examiner* — Lisa Caputo
*Assistant Examiner* — Janice M Soto
(74) *Attorney, Agent, or Firm* — Mannava & Kang, P.C.

(57) ABSTRACT

A fast response temperature probe which may be used for a method for measuring an instantaneous temperature of a periodically changing fluid flow within a gas turbine is proposed. The temperature probe includes a substrate and a resistive element arranged at a surface of the substrate. Therein, at least at a surface of the substrate contacting the resistive element, the substrate comprises an insulating material having a thermal product of less than 1.5 kJ/($m^2$K sqrt(s)). The substrate or at least its surface is made from polyamide-imide such as for example fiber-reinforced Torlon© 5030. The temperature probe may allow measurements of instantaneous local temperatures of very fast fluctuations of more than 50 kHz at high spatial resolutions of, e.g., less than 0.5 $mm^2$. The instantaneous temperature of a periodically changing fluid flow may be determined by correlating first and second sets of temperature measurements taking into account the periodicity of the periodically changing fluid flow.

12 Claims, 2 Drawing Sheets

(51) Int. Cl.
*F01D 17/08* (2006.01)
*F01D 21/00* (2006.01)
*G01K 13/02* (2006.01)

(56) References Cited

U.S. PATENT DOCUMENTS

| | | | |
|---|---|---|---|
| 4,991,976 A * | 2/1991 | Byles | 374/135 |
| 5,958,606 A * | 9/1999 | Wang et al. | 428/670 |
| 2006/0209920 A1* | 9/2006 | Kamiyama et al. | 374/29 |

OTHER PUBLICATIONS

Eichler, Christian "Design and operation of an unsteady total temperature probe for high spatial resolution measurements in continuous flow turbomachinery" Diploma Thesis, Nov. 2007.*

Weigel, Bjorn "Manufacture and Analysis of an Unsteady Total Temperature Probe for High Spatial Resolution Measurements in Continuous Flow Turbomachinery" Diploma Thesis, Jul. 2008.

Denton, J.D., "Loss Mechanisms in Turbomachines" ASME Journal of Turbomachinery, Oct. 1993, vol. 115/621.

Buttsworth D. R., et al., "A Fast-Response Total Temperature Probe for Unsteady Compressible Flows" ASME Journal of Turbomachinery, 1998, vol. 120/694.

Ng, W. F., et al., "High Frequency Temperature and Pressure Probe for Unsteady Compressible Flows" Review of Scientific Instruments, 1983, 54, 1678-1683.

Mansour, M., et al., "Unsteady Entropy Measurements in a High-Speed Radial Compressor" ASME Journal of Turobmachinery, Mar. 2008, vol. 130/021603-1.

Eichler, Christian "Design and Optimization of an Unsteady Total Temperature Probe for High Spatial Resolution Measurements in Continuous Flow Turbomachinery" Diploma Thesis, Nov. 2007.

* cited by examiner

FAST RESPONSE TEMPERATURE MEASUREMENT WITHIN A GAS TURBINE

CLAIM FOR PRIORITY

The present application claims priority under 35 U.S.C. §371 to PCT Application PCT/EP2009/004198, filed on Jun. 10, 2009, the disclosure of which is hereby incorporated by reference in its entirety.

FIELD OF THE INVENTION

The present invention relates to a fast response temperature probe and to a method for determining an instantaneous total temperature of a periodically changing fluid flow within a gas turbine.

BACKGROUND OF THE INVENTION

A primary goal in the design of gas turbines or turbomachines is to have higher efficiencies and wider operating ranges. Thus, a substantial effort is made to understand loss mechanisms and their origins in various components of a gas turbine.

A reduction of losses in any component of a gas turbine used for example as an aircraft engine may lead to a higher efficiency of the entire system. Compressor and turbine stages are especially attractive for loss reductions since the principle of work exchange between them results in an over-proportional increase in net power output for a given efficiency improvement in either of them. This fact has lead to detailed investigations of the flow phenomena in blade and vane rows as well as their unsteady interaction. The identification and localization of loss sources in the flow field plays a major role in this process. On the one hand, it may permit blade and end wall modifications to be applied just at the right place. On the other hand, innovative geometries may be checked against their actual performance.

In spite of improvements in the analysis of loss mechanisms based on computer simulations, experimental investigations are still indispensable. Unsteady flow phenomena like an outflow from a rotor in the absolute frame of reference or eddy shedding in the wake of a vane put high demands on an experimental technique.

Suitable probes should be able to follow fluctuating flow variables such as a local instantaneous total temperature or total pressure as they express a change in entropy which is an indicator for loss mechanisms and, finally, the efficiency. In order to obtain precise results having a higher time resolution than the order of magnitude of the "blade passing frequency" and both shorter and smaller than the order of magnitude of a time scale and dimension of turbulences, both a very high temporal and spatial resolution may be required for the measurements. The required sophistication of such measurement systems becomes obvious by considering the fluctuation frequencies of unsteady flow variables in actual test rigs. In order to be able to resolve typical temperature fluctuation frequencies of 50 kHz, measurements may need to be acquired at acquisition rates of 100 kHz or more.

SUMMARY OF THE INVENTION

There may be a need to determine a fluctuating temperature within a gas turbine with a high temporal resolution of for example more than 50 kHz and with a high spatial resolution of for example less than 1 mm². Particularly, there may be a need to determine the total temperature, also referred to as stagnation temperature, within turbine test rigs with such high temporal and spatial resolution. Particularly, there may be a need for a fast response temperature probe being adapted for acquiring temperature data at such high temporal and spatial resolution.

Furthermore, there may be a need for a method for measuring an instantaneous total temperature of a periodically changing fluid flow within a gas turbine, the method allowing for acquiring a local temperature at such high temporal and spatial resolution.

Preferably, both the temperature probe and the temperature measuring method should be adapted to allow miniaturization and robustness such that high frequency temperature measurements in a harsh environment within a gas turbine test rig may be achieved.

These needs may be met with the subject-matter as defined in the appended independent claims. Advantageous embodiments are described in the dependent claims.

According to a first aspect of the present invention, a fast response temperature probe comprises a substrate and a resistive element. The resistive element has a temperature-dependent electrical resistance and is arranged at a surface of the substrate. Therein, at least at a surface of the substrate contacting the resistive element, the substrate comprises an insulating material having a thermal product of less than 1.5 $kJ/(m^2K\sqrt{(s)})$.

In order to measure temperatures, it is well-known to measure a temperature-dependent parameter such as an electrical resistance of a resistive element. Conventionally, such resistive element may be provided as a small wire through which an electrical current may be transferred and the electrical resistivity of which can be determined in order to obtain an indication of the temperature of the wire. However, in order to have a sufficient mechanical strength, such wire usually needs to have substantial dimensions, especially a substantial diameter. As the volume, the temperature of which is determined by the resistive element, is mainly determined by the dimensions of the resistive element, the spatial resolution of temperature measurements using such conventional resistive element is relatively low. Furthermore, due to the substantial dimensions of the resistive elements, the thermal capacity of such wire may be relatively high such that the wire reveals certain inertia when following fast temperature fluctuations. Accordingly, the temporal resolution of temperature measurements using such conventional resistive element is relatively low.

It is proposed herein to provide a resistive element by arranging it at a surface of a substrate. Using such substrate as a carrier, the substrate may provide for the necessary mechanical strength and thus, the dimensions of the resistive element may be strongly reduced. Thereby, the resistive element used for the temperature probe may be reduced in its overall dimensions thereby allowing for an increased spatial resolution. In other words, as the resistive element may be miniaturized by arranging it on a carrier substrate, the dimensions of a volume the temperature of which is to be measured may be reduced.

However, as the resistive element is arranged on a substrate, heat transfer between the resistive element and the substrate should be minimized as far as possible in order to reduce inertia of the temperature probe due to such heat transfer. In other words, it should be possible to heat the resistive element very fast without necessarily heating the substrate or its surface at the same rate.

Therefore, it is proposed to use a substrate which, at least at a surface of the substrate contacting the resistive element, comprises a thermally insulating material having a thermal product of less than 1.5 kJ/(m²K sqrt(s)) (=1.5 kJ/(m²K √(s))), preferably less than 1.0 kJ/(m²K sqrt(s)), and more preferably less than 0.85 kJ/(m²K sqrt(s)) with a suitable thickness. Therein, the thermal product tp may be defined as the square root of the density ρ times the thermal capacity c times the thermal conductivity k (tp=sqrt(ρ*c*k) which is an indicator of the isolation properties of the substrate material.

When the proposed fast response temperature probe is brought in contact with a fluid such as a gas or a liquid showing fast temperature fluctuations, the temperature of the miniaturized resistive element may quickly follow the temperature fluctuations as, due to the low thermal product of the material of the substrate contacting the resistive element, there is only minimal heat transfer from the resistive element to the substrate surface. Accordingly, such temperature probe may allow measuring temperature profiles with very high temporal resolution of for example more than 50 kHz.

Furthermore, due to the low thermal product of the insulating material adjacent to the resistive element, the resistive element may be easily heated to substantial temperatures upon passing a constant electrical heating current through the resistive element. Accordingly, by applying a low electrical current to the resistive element, it may be easily heated to an elevated wall temperature. This may be advantageously used e.g. in a method for measuring an instantaneous total temperature of a fluid further described below with respect to a second aspect of the invention.

Advantageously, the insulating material of the substrate contacting the resistive element comprises polyimide or polyamide-imide.

Polyamide-imides, also referred to as PAI, are polymers comprising both amide groups and imide groups. Polyamide-imides with aromatic components in the polymer chain are highly thermally stable. The temperature resistance may be at up to 450° C. Furthermore, they provide for a good chemical and mechanical resistance. The thermal product of polyamide-imides is typically between 0.5 and 0.85 kJ/(m²K sqrt(s)), more often between 0.6 and 0.8 kJ/(m²K sqrt(s)).

Advantageously, the substrate comprises a fibre-reinforced material. The fibre-reinforcement may provide for an improved rigidity or mechanical strength of the substrate. Particularly in a case, where the substrate is provided as a long, thin rod, the stiffness of such rod may be increased by reinforcing the substrate material with fibres such as glass fibres.

Advantageously, the substrate comprises Torlon©. Torlon© is a trade name of a specific polyamide-imide provided by Solvay Advanced Polymers. Torlon© may provide for exceptional long-term strength and stiffness up to 275° C., outstanding wear resistance, superior toughness from cryogenic temperatures up to 275° C., resistance to strong acids and most organics, inherent flame resistance and low CLTE. Torlon© 4203L has a thermal product of approximately 0.66 kJ/(m²K sqrt(s)).

Alternatively, the substrate comprises Polyimide like PI2525 from HD Microsystems having a thermal product of 0.63 kJ/(m²K sqrt(s)) and being usually used for electrical devices and wafer planarization.

Advantageously, Torlon© 5030 may be used for the substrate. Torlon© 5030 is a polyamide-imide reinforced with 30% glass fibre. It provides for enhanced mechanical stiffness. For example, a thin rod made of Torlon© 5030 may be used as a substrate showing both, high mechanical stiffness and low thermal product.

It has been observed that a substrate made from a fibre-reinforced material such as Torlon© 5030 may have a rather rough surface unless it is specifically treated or finished. Surface roughnesses in the order of up to 5 μm have been observed. Due to such surface roughness, problems may occur when providing a resistive element with very small dimensions onto such rough surface. For example, in case of a resistive element comprising narrow conducting stripes having a width in the order of 10 μm, interruptions or shortcuts may occur. Furthermore, as the resistive element may have a thickness of less than 500 nm, a surface roughness of up to 5 μm may result in further problems such as e.g. a not complete surface coverage in the coating process due to shadowing effects. Therefore, it may be advantageous to planarize or polish the surface of a fibre reinforced substrate before depositing the resistive element thereon.

In another advantageous approach, the insulating material is provided as a coating onto a substrate base. For example, an insulating material of low thermal product such as Torlon 4203© (Solvays trade name for Torlon 4203© paint is Torlon AI-10) or PI2525 may be coated with a suitable thickness onto an arbitrary substrate base wherein the substrate base itself does not necessarily need to have a very low thermal product. When the coating has a sufficient thickness of for example between 1 μm and 100 μm, preferably between 5 μm and 60 μm, no significant heat transfer between the substrate base and the resistive element, thereby passing through the coating, should occur and accordingly the resistive element should be able to follow temperature fluctuations with low thermal inertia.

In order to provide for good mechanical stiffness, the substrate base may be provided with a fibre reinforced material. For example, the substrate base may be provided with Torlon© 5030. A possibly rough surface of such fibre reinforced substrate material may be equalized or planarized by the coating which itself is not fibre-reinforced.

Advantageously, the insulating material at the surface of the substrate comprises a coefficient of linear thermal expansion of less than $50 \times 10^6$ 1/° K, preferably less than $20 \times 10^6$ 1/° K. Besides their low thermal products, there usually exists a gross discrepancy in the coefficient of linear thermal expansion β of metals usually used for the resistive element and conventional polymers usually used for a substrate. Herein, the coefficient of linear thermal expansion β is defined by: β(T)=1/L*dL/dT. Herein, L is the length of the object. The coefficient β is either given at a certain temperature T or as an average value over a temperature range.

Since the resistive element of the proposed temperature probe is in direct thermal contact with a surface of the substrate and is periodically heated up and cooled down during operation, a difference in thermal expansion of the resistive element and the substrate may induce thermal stresses. Accordingly, it may be advantageous to use materials for the resistive element and materials for the substrate having at least similar coefficients of linear thermal expansion β. For example, possible materials for the resistive element may be nickel (Ni) having a coefficient of linear thermal expansion β of $13.75 \times 10^{-6}$ 1/° K in a temperature range of 0 to 200° C. or platinum (Pt) having a β of $9.15 \times 10^{-6}$ 1/° K in a temperature range of 0 to 200° C. Advantageous insulating materials for the substrate may be Torlon© 5030 with a β of for example $16.2 \times 10^{-6}$ 1/° K or Torlon© 4203 with a β of for example $30.6 \times 10^{-6}$ 1/° K. An alternative material is PEEK (PolyEtherEtherKetone) typically having a β of $20\text{-}50 \times 10^{-6}$ 1/° K, polyimide such as PI2525 typically having a β of 20-40×10⁻⁶ 1/° K or LCP (Liquid Chrystal Polymer) with a β of typically 20×10⁻⁶ 1/° K.

Advantageously, the resistive element comprises a thin film gauge including a meander-shaped metal thin film. In other words, the resistive element may be made with a thin conducting stripe being arranged in a meander-pattern or serpentine-pattern. The conducting metal thin film may have a thickness of between 10 and 1.000 nm, preferably between 100 and 500 nm, and a width of less than 50 µm, preferably between 2 µm and 20 µm. The meander-pattern or serpentine-pattern may be arranged such that a maximum length of metal stripes is provided on a minimum surface area. For example, the pattern may have a rectangular, square or circular shape. For example, the pattern may extend over a surface area of less than 1 mm², preferably less than 0.2 mm².

The metal thin film may comprise nickel and/or platinum or consist of nickel or platinum which, due to their high resistivity and high temperature coefficient of resistance, allow for a high temperature sensitivity of the resulting resistive element.

Advantageously, the substrate is rod-shaped having a surface-shell with low aerodynamic resistance to a fluid flow perpendicular to the rod-shaped substrate. In other words, the substrate may have an elongate shape a cross-section of which is formed such that a fluid may flow around the substrate in a direction perpendicular to the longitudinal axis of the substrate with low or minimum aerodynamic resistance. As further described below, such geometric shape may be advantageous when using the temperature probe for measuring a fluid flow of high velocity for example within a gas turbine. Therein, the advantageous aerodynamic shape of the substrate may prevent excessive bending forces onto the substrate during the measuring process. For example, the substrate may be provided with a cylindrical or semi-cylindrical shape.

Advantageously, the temperature probe comprises exactly one resistive element. In other words, the temperature probe does not comprise two or more resistive elements. As will be more apparent from the description of the method for measuring a temperature in accordance with a second aspect of the present invention as described below, it may be sufficient to provide the temperature probe with only one resistive element which may then be operated under different operating conditions. Using only one resistive element may provide for a reduced temperature measuring area compared to approaches where the temperature is measured with two or more resistive elements provided on a same temperature probe.

According to a second aspect of the present invention, a method for measuring an instantaneous total temperature of a periodically changing fluid flow within a gas turbine is proposed. The method comprises: (a) positioning a fast response temperature probe at a position within the fluid flow; (b) acquiring a first set of temperature measurements $T_{w1}$ with the fast response temperature probe by applying a constant measurement current; (c) setting the fast response temperature probe to a different temperature; (d) acquiring a second set of temperature measurements $T_{w2}$ with the fast response temperature probe; and (e) determining the instantaneous total temperature by correlating the first and second sets of temperature measurements $T_{w1}$ $T_{w2}$ taking into account the periodicity of the periodically changing fluid flow in the gas turbine.

The method steps (a) to (e) may be performed in the indicated order, i.e. first, a first set of temperature measurements $T_{w1}$ is acquired and possibly stored within a memory, then the temperature of the temperature probe, particularly of its temperature detection surface, is changed by changing the current, and then a second set of temperature measurements $T_{w2}$ is acquired and possibly stored in a memory. Therein, $T_{w1}$ and $T_{w2}$ may be the wall temperatures of the temperature probe where one wall temperature $T_{w1}$ may substantially correspond to an averaged temperature of fluid contacting the probe's wall and the other wall temperature $T_{w2}$ is higher.

In other words, during measuring the first set of temperatures $T_{w1}$, the temperature probe may not be heated, i.e. no significant current is passed through the resistive element of the temperature probe, and the instantaneous temperature of the resistive element substantially corresponds to the instantaneous temperature of the fluid being in contact therewith. During measuring the second set of temperatures $T_{w2}$, the temperature probe may be heated, i.e. a significant constant current is passed through the resistive element of the temperature probe, thereby heating the probe to an elevated temperature. At this elevated temperature, temperature fluctuations in the resistive element due to temperature fluctuations in the fluid contacting the resistive element may be measured. The wall heat fluxes $\dot{q}_1$ and $\dot{q}_2$ will be different during measurement of the first set of temperatures $T_{w1}$ and the second set of temperatures $T_{w2}$, respectively due to the different temperatures of the probe wall.

Finally the acquired temperature measurement sets may be used to determine instantaneous total temperatures at each point in time in a time-dependent temperature profile. Therein, it may be advantageously used that the fluid flow changes its temperature periodically with each rotor revolution and that the periodicity of such change may be determined such that the instantaneous temperature may be determined for each phase of the period by using the temperature measurements of the respective phase point in time from the first set of temperature measurements $T_{w1}$ and the second set of temperature measurements $T_{w2}$. For determining the periodicity of the periodically changing fluid flow, knowledge on the continuously changing rotation position of a rotor within the gas turbine and of the position of the blades arranged at its circumference may be used.

Having determined the wall temperatures $T_{w1}$ and $T_{w2}$ as well as calculated the wall heat fluxes $\dot{q}_1$ and $\dot{q}_2$, the total temperature $T_t$, also referred to as stagnation temperature, may be determined at the location of the temperature detection surface of the temperature probe.

The principle of this gas temperature measurement is based on two temperature measurements with different probe temperatures assuming the heat transfer coefficient h to be identical for both measurements (which may be assumed as a result of the periodicity of the fluid flow and assuming a fixed measurement position):

$$\dot{q}_1 = h(T_t - T_{w1})$$

$$\dot{q}_2 = h(T_t - T_{w2})$$

The evaluation of the heat fluxes at the wall $\dot{q}_1$ and $\dot{q}_2$ from surface temperature resolution may be done as follows: A thin metallic conductor stripe deposited on an isolating substrate may allow monitoring the surface temperature by its resistance change. This boundary condition being known as well as the substrate temperature at a given depth, one can solve the unsteady heat conduction equation in the substrate:

$$\frac{\partial T}{\partial t} = a \frac{\partial^2 T}{\partial x^2}$$

Herein, a 1D case without source terms and constant properties is assumed. The solution can be performed by analogue or numerical techniques like the Crank-Nicolson schema.

The implicite Crank-Nicholson discretization of the 1D heat conduction equation has the form:

$$\frac{T_i^{n+1} - T_i^n}{\Delta t} = a \frac{T_{i+1}^{n+1/2} - 2T_i^{n+1/2} + T_{i-1}^{n+1/2}}{\Delta x^2}$$

The wall heat flux at the n_th time step is computed from the first two grid points i=0 and i=1

$$\dot{q}_w = -k \frac{T_1^n - T_0^n}{\Delta x}.$$

Further information on such calculation may be derived from Minkowycz, W. J.: "Handbook of numerical heat transfer", 2. Ed, Hoboken, N.J.: Wiley, 2006, ISBN 0-471-34878-3 978-0-471-34878-8, pp. 73 ff.

The heat fluxes of the wall being known as well as the surface temperature, the above equations may be rewritten as:

$$h = \frac{\dot{q}_1 - \dot{q}_2}{T_{w2} - T_{w1}}$$

$$T_t = T_{w1} + \dot{q}_1 \cdot \frac{T_{w2} - T_{w1}}{\dot{q}_1 - \dot{q}_2}$$

Accordingly, as a result, these two measurements allow the determination of the heat transfer coefficient h and the gas total temperature $T_t$ at a specific time t.

Furthermore, a transition between the two wall temperatures may also be acquired and stored in order to extract further information e.g. on a heat transfer coefficient by numerical postprocessing.

Advantageously, the first and second sets of temperature measurements $T_{w1}$, $T_{w2}$ are acquired at a same position within the fluid flow. In other words, the temperature probe may remain static during the entire measuring process and, finally, a value of the gas total temperature at the position of the temperature probe's temperature detection surface may be provided. Accordingly, for acquiring both, the first and the second sets of temperature measurements $T_{w1}$, $T_{w2}$, providing only a single temperature probe is sufficient as the sets of temperature measurements may be acquired one after the other. The only one temperature probe may remain static at the same position such that the spatial resolution of the temperature measurement is mainly determined by the temperature detection surface of the temperature measurement probe.

Advantageously, the fast response temperature probe is set to a different temperature by inducing an electrical heating current through the temperature probe. In other words, the temperature probe may comprise a resistive element for acquiring the sets of temperature measurements $T_{w1}$, $T_{w2}$. On the one hand, the resistive element may be used to determine an instantaneous temperature by determining the instantaneous temperature-dependent resistance of the resistive element due to changes in the fluid. On the other hand, a constant bias current through the resistive element may be used to heat the resistive element during temperature measurement acquisition by generating Joule's heat. Accordingly, by inducing such electrical heating current, the wall temperature of the temperature probe may be set to a different temperature compared to a case without such electrical heating current. Alternatively, different heating currents may be passed through the resistive element during acquiring the first and second measurement set, respectively, thereby heating the temperature probe's temperature detection surface to different wall temperatures.

Advantageously, the first and second sets of temperature measurements $T_{w1}$, $T_{w2}$ are acquired at an acquisition rate of more than 20 kHz, preferably more than 80 kHz and more preferably more than 160 kHz. For example, when using the fast response temperature probe as described further above with respect to the first aspect of the invention, the first and second sets of temperature measurements $T_{w1}$, $T_{w2}$ may be acquired with very high acquisition rates of between 80 kHz and approximately 500 kHz. With such high acquisition rates, temperature fluctuations within the fluid flow may be determined at very high temporal resolution which may allow to better analyze physical processes for example occurring in a fluid flow through a gas turbine.

It has to be noted that aspects and embodiments as well as features and advantages of the present invention are described herein with reference to different subject-matters. In particular, some embodiments have been described with reference to the proposed fast response temperature probe whereas other embodiments have been described with reference to the method of measuring an instantaneous temperature in a fluid flow. However, a person skilled in the art will gather from the above and the following description that, unless other notified, in addition to any combination of features belonging to one type of subject-matter also any combination between features relating to different subject-matters is considered to be disclosed with this application.

BRIEF DESCRIPTION OF THE DRAWINGS

Features and advantages of the present invention will be further described with reference to specific embodiments as shown in the accompanying figures but to which the invention shall not be limited.

All figures are only schematically and not to scale. Same reference signs refer to same or similar elements throughout the figures.

DETAILED DESCRIPTION OF PREFERRED EMBODIMENTS

Figure 1:
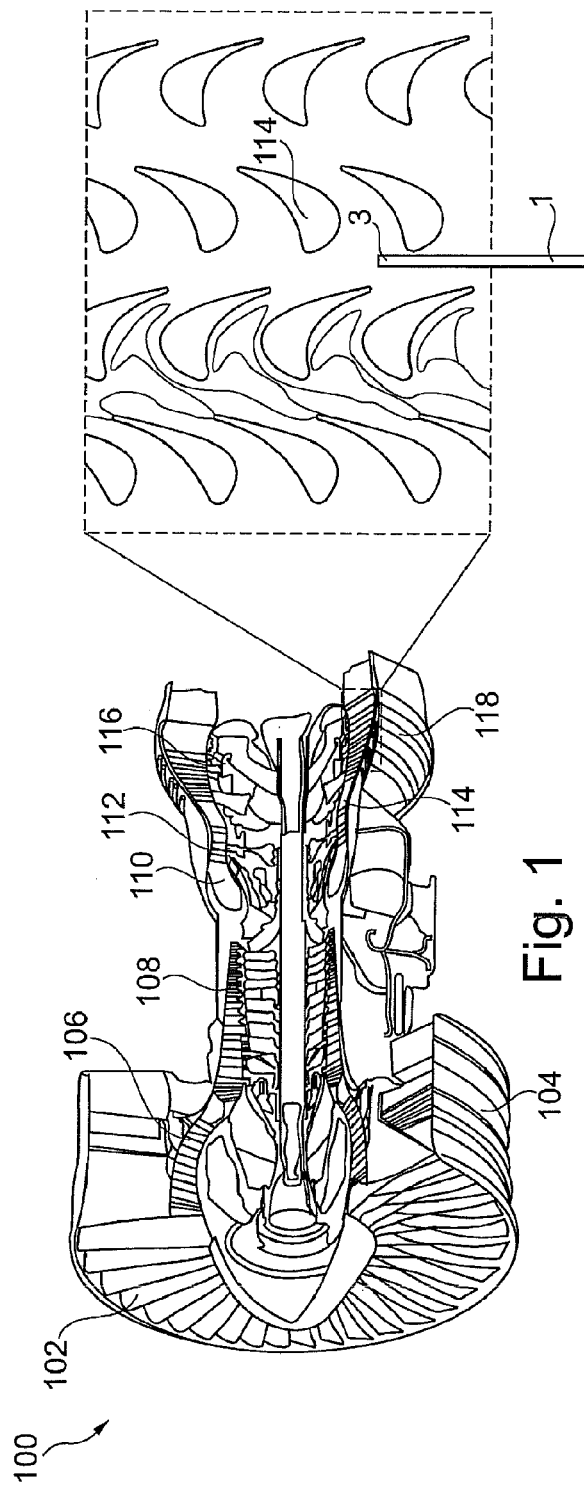
FIG. 1 shows a conventional gas turbine.

FIG. 1 shows a conventional gas turbine 100 as can be used for example for an aircraft. The gas turbine comprises a fan 102 rotating within an inlet case 104 in front of a low pressure compressor 106. In a central region of the turbine 100, a high pressure compressor 108 is arranged in front of a combustion chamber 110. Inlet air entering the turbine 100 through the fan is compressed in the low and high pressure compressor before being fed to the combustion chamber. In the combustion chamber, fuel is added to the inlet air and combusted. The expanding combustion gases then enter a high pressure turbine 112 including rotating turbine blades 114 and finally pass through a low pressure turbine 116. The blades 114 of the high pressure turbine 112 and the low pressure turbine 116 are arranged within a turbine exhaust case 118.

Figure 2:
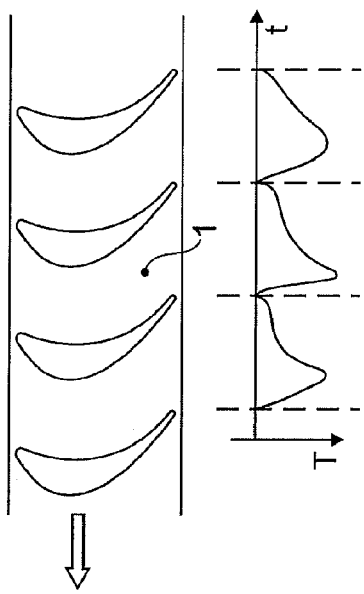
FIG. 2 illustrates a spatial temperature distribution within a turbine exhaust region of a gas turbine.

FIG. 2 shows an enlarged visualization of a spatial temperature distribution in a region between a set of turbine blades 114 of the low pressure turbine 116 enclosed within the turbine exhaust case 118. As can be seen from FIG. 2, there are significant temperature inhomogeneities within the gas flow exiting the turbine exhaust. As this gas flow exits the turbine exhaust at velocities of approximately Mach1, the temperature fluctuations within the gas flow pass very quickly along a specific position indicated by the tip 2 of a fast response temperature probe 1 introduced into the gas flow through a small opening within the turbine exhaust case 118.

Figure 3:
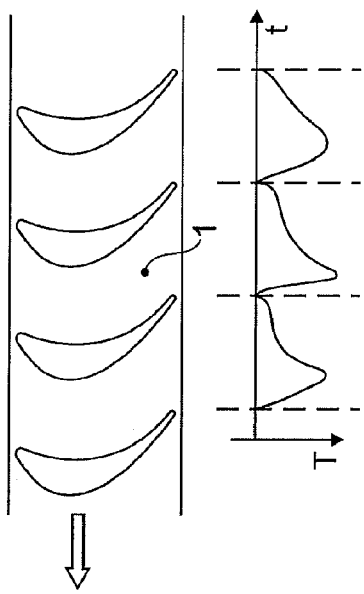
FIG. 3 illustrates time dependence of a temperature at a specific measuring site within a turbine exhaust region.

FIG. 3 shows time-dependent temperature fluctuations at a specific location of a probe 1 arranged within a gas flow in a gas turbine adjacent to blades 114.

For experiments serving for analyzing gas flow properties within a gas turbine, test rigs may be used in which a gas flow is forced through a gas turbine however without combusting fuel within the combustion chamber. Accordingly, there are no highly elevated temperatures within the gas flow. Typical gas temperatures may be in a range of 40 to 60° C. up to 200° C. However, the temperature distribution within the gas flow may be similar to the actual operating conditions at high temperatures and may provide valuable information on the gas flow characteristics.

Figure 4:
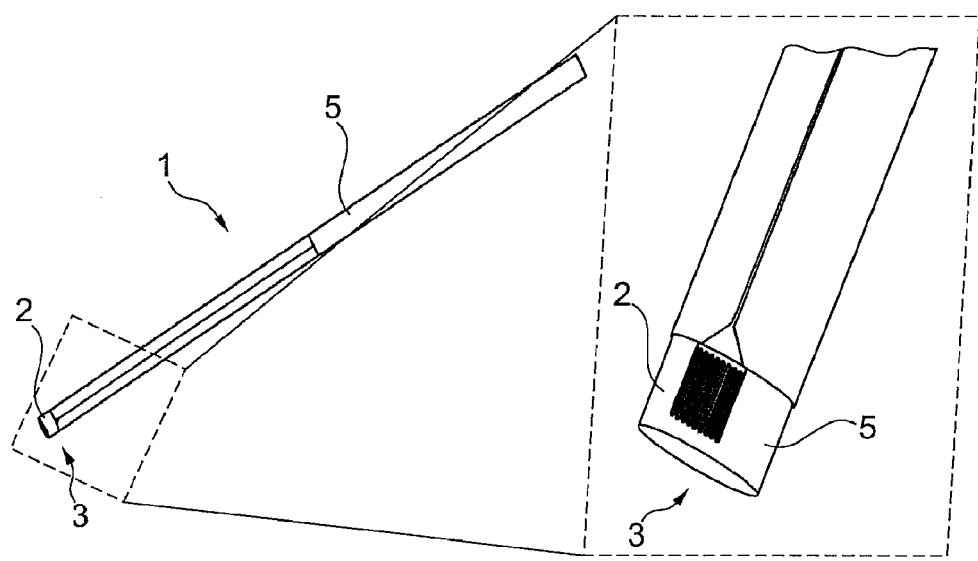
FIG. 4 shows a fast response temperature probe according to an embodiment of the present invention.
Figure 5:
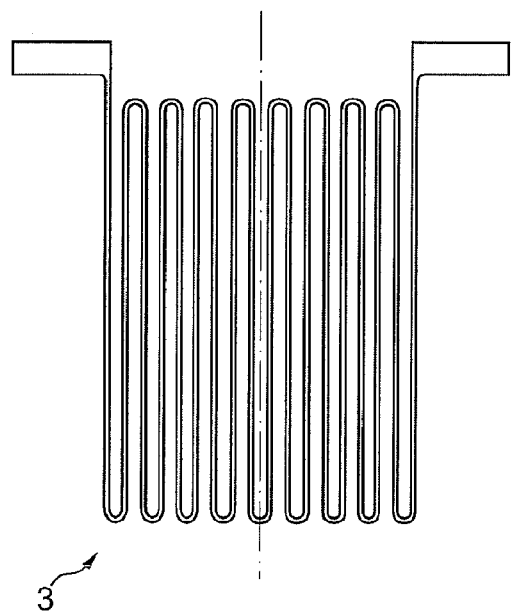
FIG. 5 shows a meander-pattern for a resistive element in a temperature probe according to an embodiment of the present invention.

FIG. 4 shows a fast response temperature probe 1 according to an embodiment of the present invention. In the figure, a tip 2 of the temperature probe 1 is separately shown at an enlarged scale. The structure of the resistive element 3 provided at the tip 2 of the temperature probe 1 is schematically shown in FIG. 5.

A substrate 5 of the temperature probe 1 comprises a cylindrical rod made from a glass fibre-reinforced polyamide-imide Torlon© 5030 having a diameter of 1 mm. Due to the glass fibre-reinforcement, even a rod with such small diameter has a sufficient rigidity for being positioned within a fast flowing fluid within the turbine exhaust case. A surface of the rod substrate has been polished or coated with another Torlon© coating in order to planarize the surface. On the cylindrical surface of this substrate rod, a nickel thin film having a thickness of 100 nm is deposited using for example PLD (Pulsed Laser Deposition) or sputtering deposition.

In the nickel thin film, conducting stripes are created in a meander-like fashion using a laser on a surface area of 350 µm by 400 µm. As shown in FIG. 5, the conducting stripes of the meander-pattern have a width of approximately 10 µm and a length of approximately 400 µm and are arranged side by side along an overall width of approximately 350 µm. The substrate rod is coated with a gold layer of 1 µm thickness in order to provide contacts to be contacted by external measuring devices.

With such fast response temperature probe 1, the local temperature of a fluid directly adjacent to the resistive element 3 may be measured at a very fast rate. With the nickel thin film providing the resistive element 3, tempera-ture measurements can be achieved at a frequency of up to 88 kHz. It has been calculated that with a metal thin film layer made of platinum, frequencies of even up to 470 kHz may be attained. The spatial resolution is in the order of magnitude of the surface of the resistive element 3, i.e. 350 µm by 400 µm=0.14 mm².

Furthermore, as the thermal expansion of the Torlon© 5030 rod substrate is substantially the same as the thermal expansion of the metal used for the resistive element 3, failures due to cracks occurring as a result of differing thermal expansion coefficients of adjacent materials may be effectively prevented. Furthermore, errors resulting from changes of an electrical resistance due to mechanical strains or compressions may be minimized.

Using such fast response temperature probe 1 having a single resistive element 3 of very small detection surface, the method of measuring an instantaneous temperature of a periodically changing fluid flow within the gas turbine may be advantageously performed. First, the temperature probe 1 may be inserted into the fluid flow within the gas turbine through a small hole within the turbine exhaust case. The temperature probe is fixedly positioned and a first set of temperature measurements $T_{w1}$ of the passing gas flow is acquired during a first time span. During this first time span, a first constant electrical current is passed through the resistive element 3. This first electrical current may be chosen as low as to only negligibly heat the resistive element 3 thereby. Due to resistance changes a resistive voltage change may be recorded with a suitable measurement device. Then, the electrical current through the resistive element 3 is changed to another constant value thereby heating the resistive element 3 to a different temperature. As soon as the temperature within the resistive element 3 has stabilized, a second set of temperature measurements $T_{w2}$ is acquired during a second time span. During the second time span, the electrical current through the resistive element again remains constant, i.e. the temperature measurement is made at constant current (CCA measurement). The first and second sets of temperature measurements $T_{w1}$, $T_{w2}$ acquired at different constant electrical currents resulting in different wall temperatures and different heat fluxes may be used to finally calculate the total temperature of the gas at the location of the resistive element 3. In calculating the total temperature, the periodic characteristics of the turbine gas flow and the assumption of the same heat transfer coefficient for both temperatures of the resistive element may be used. By additionally storing the actual position within a revolution of the turbine and of the respective blade positions, the measured values may be correctly assigned and averaged. The assignment may be done based on a known rotational frequency or an angle position of a rotation axis.

It should be noted that the term "comprising" does not exclude other elements or steps and that the indefinite article "a" or "an" does not exclude the plural. Also elements described in association with different embodiments may be combined. It should also be noted that reference signs in the claims shall not be construed as limiting the scope of the claims.

LIST OF REFERENCE SIGNS

1 Fast response temperature probe
2 probe tip
3 Resistive element
5 Substrate
100 Gas turbine
102 Fan 104 Inlet case
106 Low pressure compressor
108 High pressure compressor
110 Combustion chamber
112 High pressure turbine
114 Turbine blades
116 Low pressure turbine
118 Turbine exhaust case

The invention claimed is:

1. A fast response temperature probe comprising:
a substrate;
exactly only one resistive element;
wherein the exactly only one resistive element has a temperature-dependent electrical resistance and wherein a first side of the exactly only one resistive element contacts a surface of the substrate and a second side of the exactly one resistive element is uncovered;
wherein the surface of the substrate contacting the exactly only one resistive element is formed of polyimide or polyamide-imide having a thermal product of less than 1.5 kJ/(m² K sqrt(s)).

2. The probe according to claim 1, wherein the substrate comprises a fiber-reinforced material.

3. The probe according to claim 1, wherein the substrate comprises polyamide-imide with fibre-reinforcement.

4. The probe according to claim 1, wherein the polyimide or polyamide-ide is provided as a coating onto a substrate base.

5. The probe according to claim 1, wherein the polyimide or polyamide-ide comprises a coefficient of linear thermal expansion of less than $50*10^{-6}$ 1/° C.

6. The probe according to claim 1, wherein the exactly only one resistive element comprises a thin film gauge including a meander-shaped metal thin film.

7. The probe according to claim 6, wherein the metal thin film comprises at least one of nickel and platinum.

8. The probe according to claim 1, wherein the substrate is rod-shaped having a surface shell with low aerodynamic resistance to a fluid flow perpendicular to the rod-shaped substrate.

9. A method for measuring an instantaneous total temperature of a periodically changing fluid flow within a gas turbine, the method comprising:
positioning a fast response temperature probe comprising exactly only one resistive element at a position within the fluid flow;
acquiring a first set of temperature measurements $T_{w1}$ with the fast response temperature probe, wherein the fast response temperature probe is at a first wall temperature;
setting the fast response temperature probe to a second wall temperature that is different from the first wall temperature;
acquiring a second set of temperature measurements $T_{w2}$ with the fast response temperature probe;
determining the instantaneous total temperature by correlating the first and the second sets of temperature measurements $T_{w1}$, $T_2$,
wherein the first and second sets of temperature measurements $T_{w1}$, $T_2$ are acquired at a same position.

10. The method of claim 9, wherein the fast response temperature probe is set to a different temperature by inducing a constant electrical heating current through the temperature probe.

11. The method of claim 9, wherein the first and second sets of temperature measurements $T_{w1}$, $T_{w2}$ are acquired at an acquisition rate of more than 100 kHz.

12. The method of claim 9, further comprising:
determining the periodicity of the periodically changing fluid flow, wherein the periodicity has phases; and
wherein determining the instantaneous total temperature further comprises determining the instantaneous total temperature for each phase of the determined periodicity by using temperature measurements of the respective phase point in time from the first set of temperature measurements $T_{w1}$ and the second set of temperature measurements $T_{w2}$.

* * * * *